(12) United States Patent
Takagi et al.

(10) Patent No.: US 9,022,174 B2
(45) Date of Patent: May 5, 2015

(54) LUBRICATION DEVICE OF POWER TRANSMISSION DEVICE FOR HYBRID VEHICLE

(71) Applicants: Kiyonori Takagi, Toyota (JP); Hiroaki Kimura, Toyota (JP); Makoto Tomita, Nagoya (JP); Norihide Tsukiashi, Toyota (JP)

(72) Inventors: Kiyonori Takagi, Toyota (JP); Hiroaki Kimura, Toyota (JP); Makoto Tomita, Nagoya (JP); Norihide Tsukiashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/160,623

(22) Filed: Jan. 22, 2014

(65) Prior Publication Data

US 2014/0174856 A1 Jun. 26, 2014

Related U.S. Application Data

(63) Continuation-in-part of application No. PCT/JP2011/066364, filed on Jul. 19, 2011.

(51) Int. Cl.
*F16H 57/04* (2010.01)
*B60K 6/445* (2007.10)
H02K 9/19 (2006.01)
*H02K 16/00* (2006.01)
*B60K 6/365* (2007.10)
H02K 7/116 (2006.01)

(52) U.S. Cl.
CPC .......... *F16H 57/0436* (2013.01); *B60K 6/445* (2013.01); *F16H 57/045* (2013.01); *F16H 57/0476* (2013.01); *F16H 57/0482* (2013.01); *H02K 9/19* (2013.01); *H02K 7/116* (2013.01); CPC ........ *H02K 16/00* (2013.01); *B60K 6/365* (2013.01); *Y02T 10/6239* (2013.01)

(58) Field of Classification Search
CPC .............. F16H 57/0436; F16H 57/045; F16H 57/0476; F16H 57/0482; B60K 6/305; B60K 6/445; H02K 9/19; H02K 16/80; H02K 7/116
USPC .................... 184/6.12, 6.22; 310/54; 165/184
See application file for complete search history.

(56) References Cited

U.S. PATENT DOCUMENTS

2005/0103570 A1* 5/2005 Gibson et al. ................ 184/6.12
2012/0091835 A1* 4/2012 Kim et al. ........................ 310/54
2012/0091836 A1 4/2012 Hayashi et al.

FOREIGN PATENT DOCUMENTS

JP  A-2007-247706  9/2007
JP  A-2008-286247  11/2008

(Continued)

OTHER PUBLICATIONS

Oct. 25, 2011 International Search Report issued in International Patent Application No. PCT/JP2011/066364 (with translation).

(Continued)

*Primary Examiner* — William E Dondero
*Assistant Examiner* — Robert T Reese
(74) *Attorney, Agent, or Firm* — Oliff PLC

(57) ABSTRACT

A lubrication device for a hybrid vehicle power transmission device including a gear member, a first electric motor, and a second electric motor within a transaxle case, the lubrication device includes: a first pipe supplying oil forcibly transferred from an oil pump to the second electric motor; an oil passage branched from the first pipe; a first catch tank supplied with oil from the oil passage; a second pipe connected to the first catch tank to supply oil accumulated in the first catch tank to the first electric motor; an oil flow outlet disposed in the first catch tank and located above the second pipe; and a second catch tank disposed vertically beneath the first catch tank to receive oil outflowing from the oil flow outlet.

7 Claims, 5 Drawing Sheets

(56) References Cited

FOREIGN PATENT DOCUMENTS

| JP | A-2010-000939 | 7/2010 |
| JP | A-2010-174961 | 8/2010 |
| JP | A-2010-242900 | 10/2010 |
| JP | A-2010-261534 | 11/2010 |

OTHER PUBLICATIONS

Oct. 25, 2011 Written Opinion of the International Searching Authority issued in International Patent Application No. PCT/JP2011/066364 (with translation).

* cited by examiner

LUBRICATION DEVICE OF POWER TRANSMISSION DEVICE FOR HYBRID VEHICLE

This is a Continuation-in-Part of International Application No. PCT/JP2011/066364 filed Jul. 19, 2011. The disclosure of the prior application is hereby incorporated by reference herein in its entirety.

TECHNICAL FIELD

The present invention relates to a lubrication device of a power transmission device included in a hybrid vehicle and particularly to a structure of a lubrication device capable of supplying oil to an electric motor and a gear member in proper distribution.

BACKGROUND ART

A power transmission device of a hybrid vehicle including an electric motor inside a case is disposed with a lubrication device for supplying oil to the electric motor and a gear member requiring lubrication. A heating part cooling structure for a vehicle drive device described in Patent Document 1 is an example thereof. The heating part cooling structure of Patent Document 1 is disposed with a catch tank 52, a first oil passage 61 for supplying oil to a first generator motor 13, and a second oil passage 62 for supplying oil to a second generator motor 14 on the upper side of a case 10. Oil is forcibly transferred from an oil pump 20 and supplied to the second oil passage 62 and the catch tank 52, and oil is scraped up by rotation of gears and supplied to the catch tank 52. The first oil passage is configured to be supplied with oil when oil accumulated in the catch tank 52 reaches a predetermined oil level. In a heating part cooling structure configured as described above, when the oil accumulated in the catch tank 52 is at a lower oil level, the oil is preferentially supplied to the second generator motor 14. A lower oil level in the catch tank 52 corresponds to a relatively lower vehicle speed state, i.e., a running state in which a running mode using the second generator motor 14 (motor running mode) is frequently used and, since the oil is preferentially supplied to the second generator motor 14 in this case, the second generator motor 14 is efficiently cooled.

PRIOR ART DOCUMENT

Patent Document

Patent Document 1: Japanese Laid-Open Patent Publication No. 2010-242900

SUMMARY OF THE INVENTION

Problem to Be Solved by the Invention

Although the second generator motor 14 is efficiently supplied with oil when the motor running mode using the second generator motor 14 is frequently used in Patent Document 1, oil must also be supplied to the first generator motor 13. In Patent Document 1, oil is not supplied to the first generator motor 13 until the oil level of the catch tank 52 reaches a predetermined value and, therefore, a time is required for supplying oil. In this regard, it is contemplated that a capacity of the catch tank 52 is made smaller so as to advance the oil supply to the first generator motor 13; however, if the capacity of the catch tank 52 is made smaller, a supply amount of oil from the oil pump 20 and a supply amount of oil due to scraping-up of gears are increased during high speed running, resulting in an increase in an amount of oil supplied from the catch tank 52 to the gear member. Excessive oil supply to the gear member causes a problem of an increase in agitation loss due to oil viscosity. The catch tank 52 is supplied with oil from the oil pump 20 and oil scraped up by the gears. The oil scraped up by the gears is at a high temperature and, even though the temperature is somewhat lowered by mixing with low-temperature oil supplied from the oil pump 20 in the catch tank 52, this causes a problem of supply of oil that is not considered appropriate for cooling an electric motor.

The present invention was conceived in view of the situations and it is therefore an object of the present invention to provide a lubrication device for a hybrid vehicle power transmission device capable of appropriately distributing an oil supply amount.

Means for Solving the Problem

To achieve the object, the first aspect of the invention provides (a) a lubrication device for a hybrid vehicle power transmission device including a gear member, a first electric motor, and a second electric motor within a transaxle case, the lubrication device comprising: (b) a first pipe supplying oil forcibly transferred from an oil pump to the second electric motor; (c) an oil passage branched from the first pipe; (d) a first catch tank supplied with oil from the oil passage; (e) a second pipe connected to the first catch tank to supply oil accumulated in the first catch tank to the first electric motor; (f) an oil flow outlet disposed in the first catch tank and located above the second pipe; and (g) a second catch tank disposed vertically beneath the first catch tank to receive oil outflowing from the oil flow outlet.

Effects of the Invention

Consequently, oil forcibly transferred from the oil pump is preferentially supplied through the first pipe to the second electric motor. On the other hand, the first electric motor is supplied with oil accumulated in the first catch tank through the second pipe. Since oil is accumulated in the first catch tank earlier than the second catch tank, the accumulated oil is quickly supplied to the second pipe. Therefore, even while a smaller amount of oil is supplied for example, even during a low vehicle speed etc., the oil supplied to the first electric motor can quickly be ensured. Although a higher vehicle speed increases amounts of oil forcibly transferred from the oil pump, since the oil flows down from the oil flow outlet of the first catch tank and is accumulated in the second catch tank, the excessive oil supply to the gear member is reduced and the agitation resistance of the gear member due to oil viscosity is reduced. As described above, oil can be supplied to the first electric motor, the second electric motor, and the gear member in appropriate distribution. Since oil forcibly transferred by the oil pump is supplied to the first electric motor and the second electric motor, high-temperature oil is prevented from being supplied to the first electric motor and the second electric motor.

Preferably, the second catch tank is disposed with a lubrication oil supply hole for supplying oil to the gear member, and the lubrication oil supply hole is disposed at a position supplied with oil when an accumulation amount of oil in the second catch tank exceeds a preset amount. Consequently, since the preset amount of oil is accumulated in the second catch tank, excessive oil supply to the gear member is prevented even during high speed running and an appropriate amount of oil can be supplied to the gear member.

Preferably, the second catch tank has a dividing wall formed for dividing into an oil accumulating portion accumulating oil and a space disposed with the lubrication oil supply hole, and when a height of an oil surface of the oil accumulating portion exceeds an upper end portion of the dividing wall, oil is supplied to the lubrication oil supply hole. Consequently, the configuration of supplying an appropriate amount of oil to the gear members is easily provided by adjusting the position of the upper end portion of the dividing wall.

Preferably, the first pipe is extended to a position vertically above the second electric motor, and the second pipe is extended to a position vertically above the first electric motor. Consequently, oil can efficiently be supplied to the first electric motor and the second electric motor.

Preferably, the oil passage is disposed in the vicinity of an oil flow inlet of the second pipe in series, and a restrictor is formed in the oil passage. Consequently, the oil outflowing from the oil passage efficiently flows into the oil flow inlet of the second pipe.

Preferably, the oil forcibly transmitted from the oil pump is supplied through a third pipe disposed outside the transaxle case to the first pipe. Consequently, the oil is cooled when passing through the third pipe and the cooled oil can be supplied to the first pipe.

Preferably, a cooler is interposed in the third pipe. Consequently, the oil passing through the third pipe is further cooled and the cooled oil can be supplied to the first pipe.

MODE FOR CARRYING OUT THE INVENTION

An example of the present invention will now be described in detail with reference to the drawings. In the following example, diagrams are simplified or modified as needed and dimensional ratios and shapes of portions are not necessarily exactly depicted.

EXAMPLE

Figure 1:
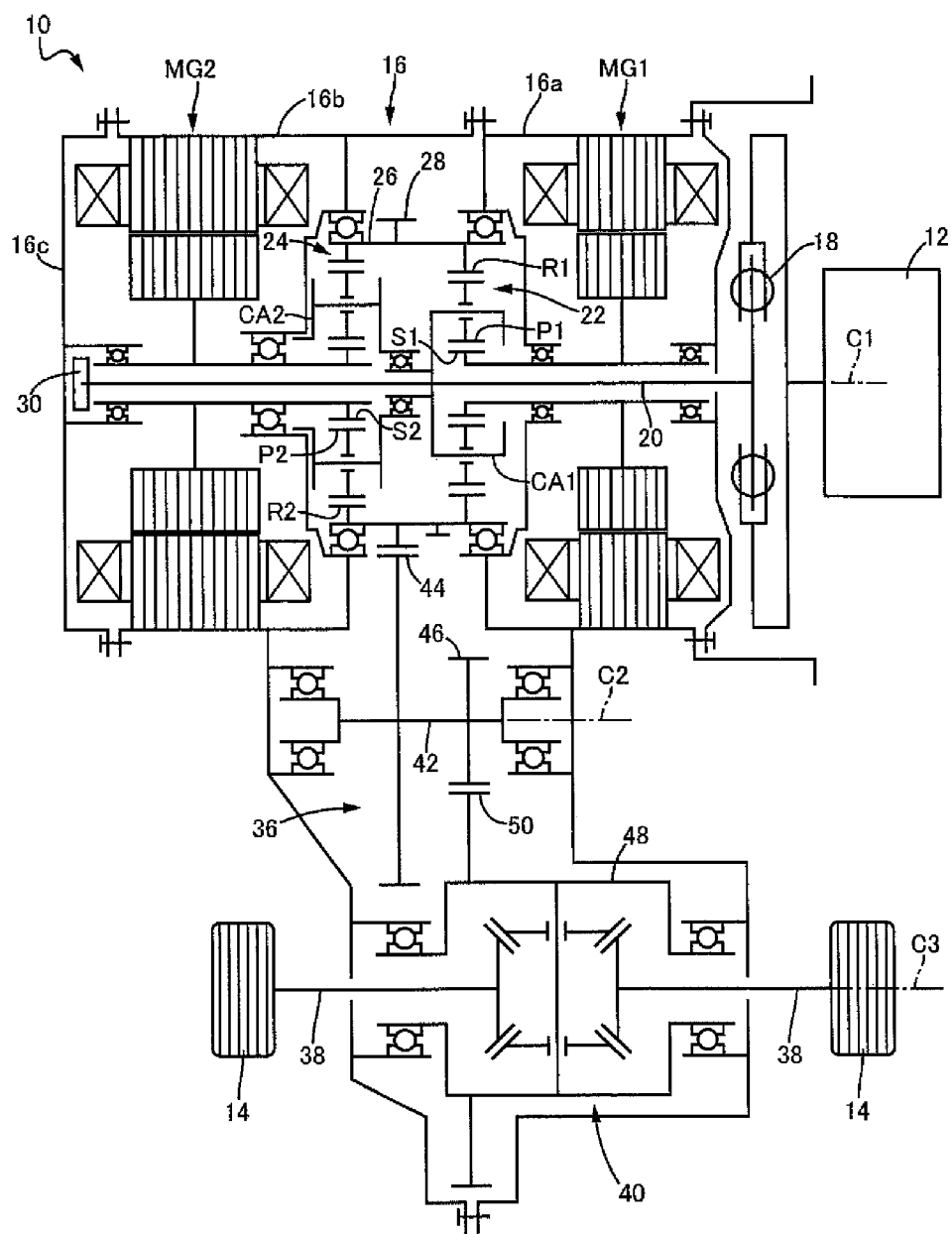
FIG. 1 is a schematic for explaining a configuration of a hybrid vehicle power transmission device of an example of the present invention.

FIG. 1 is a schematic for explaining a configuration of a hybrid vehicle power transmission device 10 (hereinafter, a power transmission device 10) of an example of the present invention. In FIG. 1, the vehicle power transmission device 10 is disposed between an engine 12 and drive wheels 14 in an FF (front-engine front-drive) type hybrid vehicle, for example. The vehicle power transmission device 10 includes in a transaxle case 16 an input shaft 20 coupled via a damper device 18 to an output shaft (crank shaft) of the engine 12, as well as a first electric motor MG1, a power distribution planetary gear device 22, a deceleration planetary gear device 24, and a second electric motor MG2 arranged concentrically with the input shaft 20 in this order from the side of the damper device 18. The damper device 18, the input shaft 20, the first electric motor MG1, the power distribution planetary gear device 22, the deceleration planetary gear device 24, and the second electric motor MG2 are disposed on a common shaft center line C1. The power distribution planetary gear device 22 and the deceleration planetary gear device 24 correspond to a gear member of the present invention.

The transaxle case 16 is configured by integrally connecting three case members, i.e., a housing 16a, a case 16b, and a cover 16c and the case members are formed by die-casting of aluminum alloy. The cover 16c is integrally disposed with an oil pump 30 driven by the engine 12.

The power distribution planetary gear device 22 is a single pinion type planetary gear device having a first sun gear S1 coupled to the first electric motor MG1, a first ring gear R1 integrally disposed at an end portion on the power distribution planetary gear device 22 side of a cylindrical output member 26 disposed on an outer circumferential side of the power distribution planetary gear device 22 and the deceleration planetary gear device 24, a plurality of first pinions P1 each meshed with the first sun gear S1 and the first ring gear R1 on an outer circumferential side of the first sun gear S1 and on an inner circumferential side of the first ring gear R1, and a first carrier CA1 coupled to the input shaft 20 and supporting each of the plurality of the first pinions P1 rotatably and revolvably around the shaft center line C1. The power distribution planetary gear device 22 acts as a power distribution mechanism mechanically distributing power from the engine 12 to the first electric motor MG1 and the cylindrical output member 26 and is disposed adjacently to the damper device 18 side of the deceleration planetary gear device 24 on an inner circumferential side of the cylindrical output member 26.

The power of the engine 12 distributed by the power distribution planetary gear device 22 to the first electric motor MG1 is used for driving the first electric motor MG1 as an electric generator. The power of the engine 12 distributed by the power distribution planetary gear device 22 to the cylindrical output member 26 is used for rotationally driving the drive wheels 14. An intermediate portion of the cylindrical output member 26 in the shaft center line C1 direction is integrally disposed with a first drive gear 28 consisting of outer circumferential teeth located between the first ring gear R1 of the power distribution planetary gear device 22 and a second ring gear R2 of the deceleration planetary gear device 24 in the shaft center line C1 direction.

The first electric motor MG1 is driven by the engine 12 via the power distribution planetary gear device 22 to act as an electric generator and charges, for example, an electric storage device such as a battery with electric energy generated by the electric generation. The first electric motor MG1 rotates the engine 12 via the power distribution planetary gear device 22, for example, at the time of engine start, thereby acting as an electric motor (engine starter).

A differential state of the power distribution planetary gear device 22 is continuously varied by controlling an operating state of the first electric motor MG1. Therefore, the power distribution planetary gear device 22 and the first electric motor MG1 make up an electric transmission portion controlling the operating state of the first electric motor MG1 to continuously vary the differential state of the power distribution planetary gear device 22, thereby varying rotation speed of the cylindrical output member 26 in a stepless manner. The first drive gear 28 formed in the cylindrical output member 26 acts as an output gear of the electric transmission portion.

The deceleration planetary gear device 24 is a single pinion type planetary gear device having a second sun gear S2 coupled to the second electric motor MG2, the second ring gear R2 integrally disposed at an end portion on the deceleration planetary gear device 24 side of the cylindrical output member 26, a plurality of (in this example, five) second pinions P2 each meshed with the second sun gear S2 and the second ring gear R2 on an outer circumferential side of the second sun gear S2 and on an inner circumferential side of the second ring gear R2, and a second carrier CA2 fit non-rotatably to the transaxle case 16 to rotatably support each of the plurality of the second pinions P2. The deceleration planetary gear device 24 acts as a reduction gear of the second electric motor MG2.

The second electric motor MG2 is caused to act as an electric motor driving the drive wheels 14 solely or along with the engine 12. The second electric motor MG2 is driven by the drive wheels 14 to act as an electric generator, for example, during deceleration of the vehicle and charges, for example, the electric storage device such as a battery with electric energy generated by the electric generation.

The vehicle power transmission device 10 also includes a reduction gear device 36 coupled to the cylindrical output member 26, and a differential gear device 40 distributing power transmitted from the reduction gear device 36 to a pair of left and right axles 38 while allowing a rotation difference thereof. The differential gear device 40 is supported rotatably around a shaft center C3. The reduction gear device 36 transmits output from the cylindrical output member 26 to the differential gear device 40 while reducing the speed thereof and has the first drive gear 28, a counter shaft 42 disposed in parallel with the input shaft 20 and supported rotatably around a shaft center C2, a first driven gear 44 disposed integrally with the counter shaft 42 and meshed with the first drive gear 28, a second drive gear 46 disposed integrally with the counter shaft 42, and a second driven gear 50 fixed to an outer circumferential side of a differential case 48 of the differential gear device 40 and meshed with the second drive gear 46.

Figure 2:
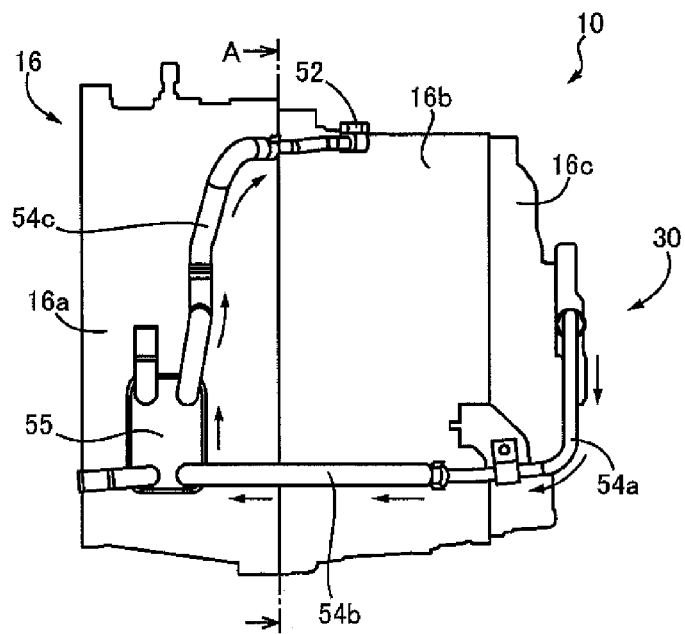
FIG. 2 is a simplified front view of the power transmission device of FIG. 1.
Figure 3:
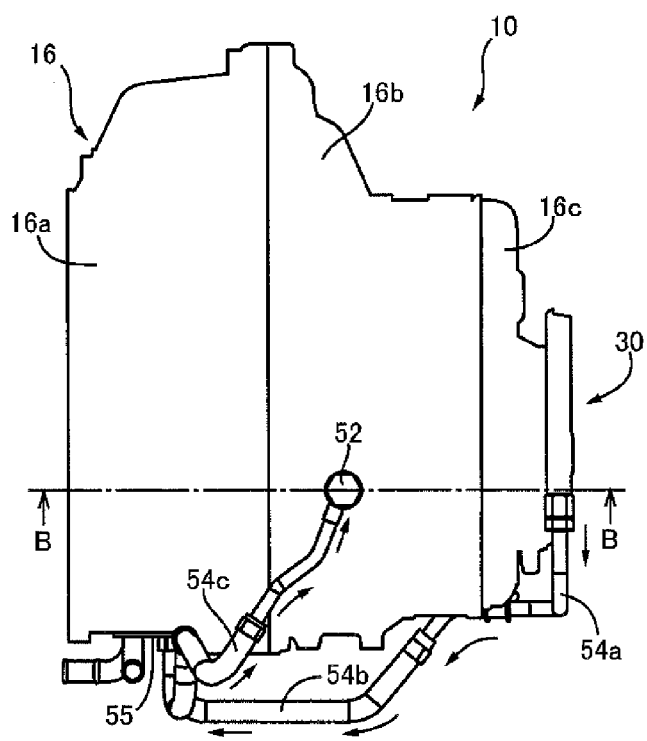
FIG. 3 is a top view of the power transmission device of FIG. 1 viewed from above.

FIG. 2 is a simplified front view of the power transmission device 10 and FIG. 3 is a top view of the power transmission device 10 of FIG. 1 viewed from above.

As can be seen from FIGS. 2 and 3, the power transmission device 10 is protected by the transaxle case 16 made up of the three case members, i.e., the housing 16a, the case 16b, and the cover 16c. The cover 16c is integrally disposed with the oil pump 30.

The oil pump 30 forcibly transfers and supplies oil accumulated in a lower side of the transaxle case 16 to an oil supply port 52 disposed on an upper portion of the transaxle case 16. Specifically, oil forcibly transferred from the oil pump 30 is supplied to the oil supply port 52 via external pipes (54a to 54c) disposed outside the transaxle case 16 as indicated by arrows. A cooler 55 is inserted between the external pipe 54b and the external pipe 54c and the oil is further cooled by passing through the cooler 55 so that the cooled oil is supplied to the oil supply port 52. Since the external pipes 54 are disposed outside the transaxle case 16, the oil is also cooled when passing through the external pipes 54. The external pipes 54 correspond to third pipe of the present invention.

Figure 4:
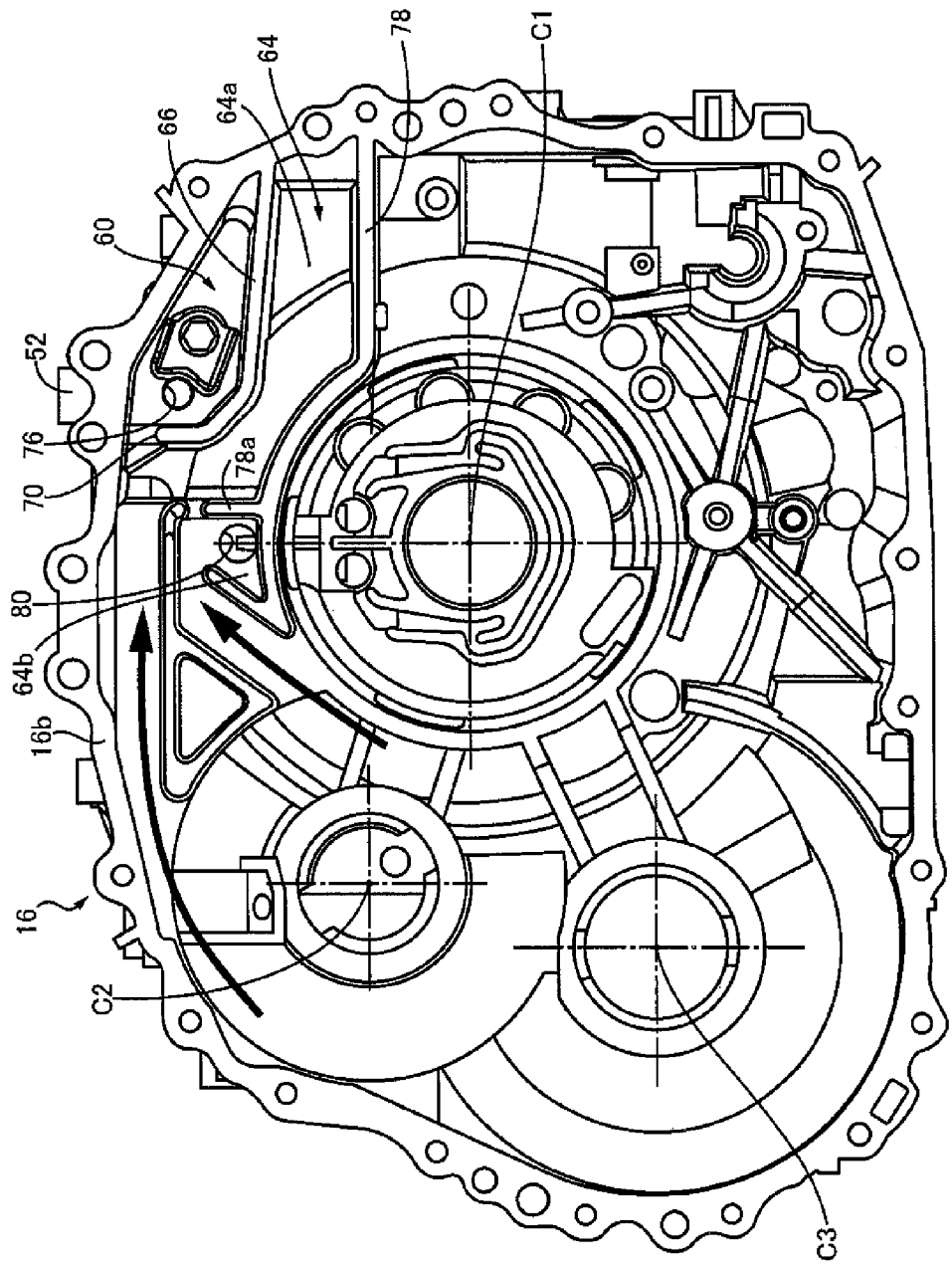
FIG. 4 is a cross-sectional view taken along A-A when the power transmission device of FIG. 2 is cut as indicated by arrows A.

FIG. 4 is a cross-sectional view taken along A-A when the transaxle case 16 of the power transmission device 10 of FIG. 2 is cut as indicated by arrows A. In FIG. 4, the first electric motor MG1, the second electric motor MG2, and the power distribution planetary gear device 22 are supported rotatably around the shaft center C1 (all not depicted). The reduction gear device 36 is supported rotatably around the shaft center C2 (not depicted). The differential gear device 40 is supported rotatably around the shaft center C3 (not depicted).

The upper portion within the transaxle case 16 of this example is disposed with a first catch tank 60 and a second catch tank 64 for accumulating oil. The second catch tank 64 is disposed vertically beneath the first catch tank 60 and has an available accumulation capacity larger than the first catch tank 60. The first catch tank 60 corresponds to a first catch tank of the present invention and the second catch tank 64 corresponds to a second catch tank of the present invention.

The first catch tank 60 is formed into a space capable of accumulating oil by a partition wall 66 having a depth formed in the case 16b. An oil flow outlet 70 is formed in the first catch tank 60. When a height of an oil surface (oil level) of the first catch tank 60 becomes higher than a lower end surface of the oil flow outlet 70, oil flows out from the oil flow outlet 70 and flows down toward the second catch tank 64. Therefore, the oil outflowing from the first catch tank 60 is received by the second catch tank 64.

The first catch tank 60 is supplied with oil inflowing from the oil supply port 52. Specifically, the oil inflowing from the oil supply port 52 is supplied to an MG2 cooling pipe 72 (see FIG. 5) described later and is supplied to the first catch tank 60 from a leading end (opening) of a communication oil passage 72b (see FIG. 5) branched from the MG2 cooling pipe 72. Since the cooled oil forcibly transferred by the oil pump 30 is supplied to the oil supply port 52, low-temperature oil is accumulated in the first catch tank 60.

The second catch tank 64 is formed into a space capable of accumulating oil by a partition wall 78 having a depth formed in the case 16b. The partition wall 78 has a dividing wall 78a formed to extend vertically upward. The dividing wall 78a divides the second catch tank 64 into an oil accumulating portion 64a in which oil is accumulated and a space 64b with a lubrication oil supply hole 80 formed. When a height of an oil surface (oil level) of the oil accumulating portion 64a exceeds a height of an upper end portion of the dividing wall 78a, oil flows out toward the space 64b with the lubrication oil supply hole 80 formed. Therefore, when an accumulation amount of oil in the oil accumulating portion 64a exceeds a preset amount, the oil flows out toward the space 64b. The oil flowing into the space 64b is supplied into the lubrication oil supply hole 80 and is supplied through the lubrication oil supply hole 80 to gears such as the deceleration planetary gear device 24. The oil accumulating portion 64a is located on the vertically lower side of the oil flow outlet 70 of the first catch tank 60 and, therefore, the oil flowing out (flowing down) from the oil flow outlet 70 is received by the oil accumulating portion 64a. On the other hand, since the space 64b is divided by a dividing wall 78b, the direct inflow of the oil from the first catch tank 60 is blocked in this structure.

The oil accumulating portion 64a of the second catch tank 64 is supplied with oil scraped up by the second driven gear 50 and the first driven gear 44 through oil canals indicated by thick arrows. Although a portion of the scraped-up oil reaches the first catch tank 60, the oil flow outlet 70 of the first catch tank 60 is disposed at an upper end portion of the case 16b and, therefore, the scraped-up oil is supplied only to the second catch tank 64. Although a portion of the scraped-up oil reaches the space 64b of the second catch tank 64, the oil is supplied through the lubrication oil supply hole 80 to the gears such as the deceleration planetary gear device 24.

Figure 5:
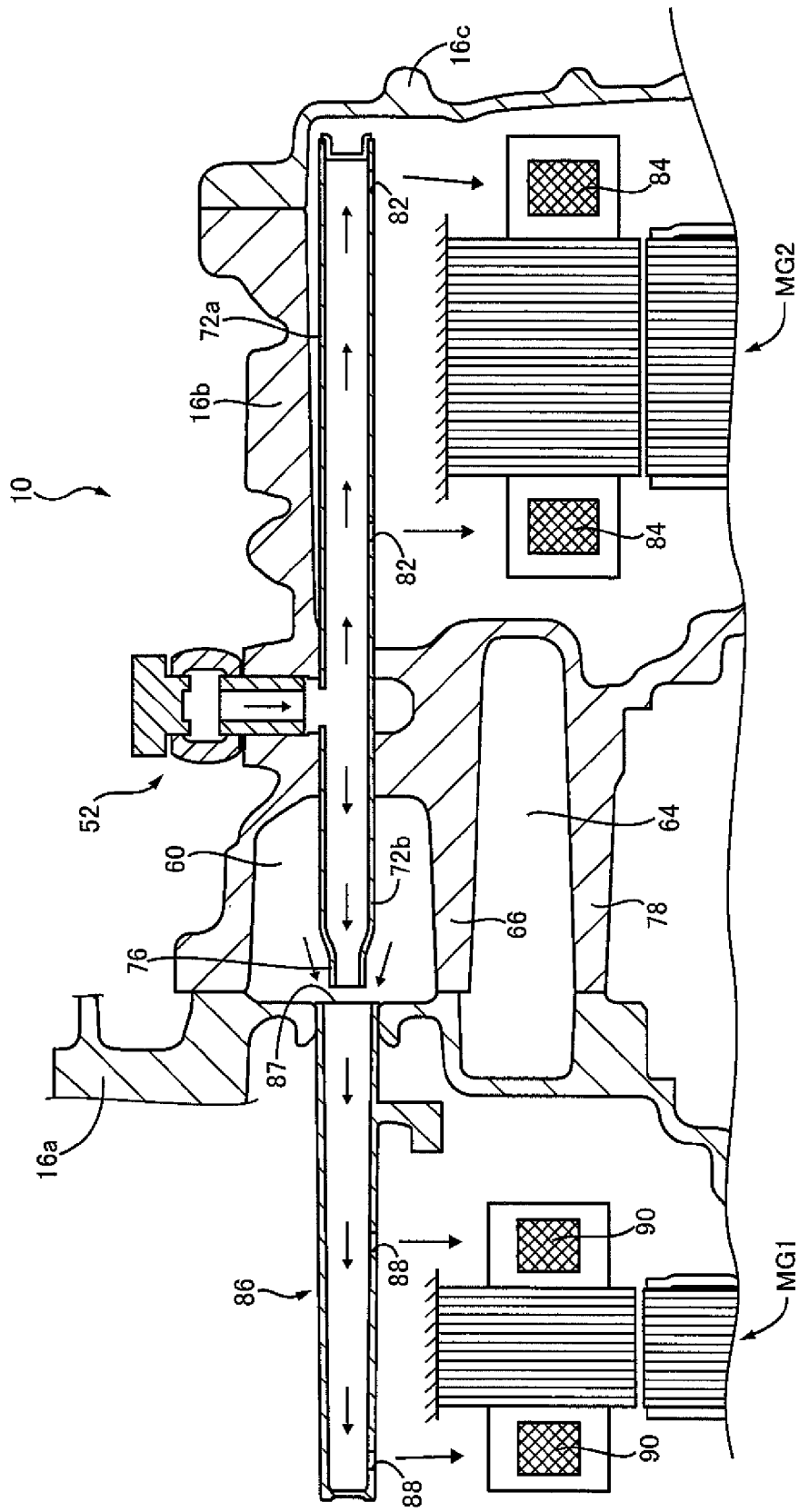
FIG. 5 is a cross-sectional view taken along B-B when the power transmission device of FIG. 3 is cut as indicated by arrows B.

FIG. 5 is a simplified cross-sectional view taken along B-B when the power transmission device 10 of FIG. 3 is cut as indicated by arrows B. As depicted in FIG. 5, the MG2 cooling pipe 72 supplying oil to the second electric motor MG2 is disposed vertically above the second electric motor MG2 in parallel with the rotation shaft center C1 of the second electric motor MG2. The MG2 cooling pipe 72 is supplied with the oil inflowing from the oil supply port 52. The MG2 cooling pipe 72 is branched in two directions to an electric motor cooling oil passage 72a and the communication oil passage 72b. The electric motor cooling oil passage 72a is axially extended to the vertically upper side of the second electric motor MG2 and, as indicated by arrows, the oil flowing through the electric motor cooling oil passage 72a is discharged from a plurality of oil discharge holes 82 formed in the electric motor cooling oil passage 72a and is supplied to coil ends 84 etc., of the second electric motor MG2. Since the oil forcibly transferred by the oil pump 30 is supplied to the MG2 cooling pipe 72, the second electric motor MG2 is effectively cooled. The MG2 cooling pipe 72 corresponds to a first pipe of the present invention and the communication oil passage 72b corresponds to an oil passage of the present invention.

As indicated by arrows, the oil flowing through the communication oil passage 72b goes out of the communication oil passage 72b and is supplied to the first catch tank 60 and an MG1 cooling pipe 86 supplying the oil accumulated in the first catch tank 60 to the first electric motor MG1 described later. The MG1 cooling pipe 86 is connected to the first catch tank 60 and is extended to the vertically upper side of the first electric motor MG1 in parallel with the rotation shaft center C1 of the first electric motor MG1. As can be seen from FIGS. 4 and 5, the oil flow outlet 70 is disposed above the MG1 cooling pipe 86. The MG1 cooling pipe 86 and the MG2 cooling pipe 72 are arranged in series at the same vertical height. An oil flow inlet 87 of the MG1 cooling pipe 86 is disposed in the vicinity of a leading end of the communication oil passage 72b, and a restrictor 76 is formed at the leading end of the communication oil passage 72b. Therefore, the oil outflowing from the restrictor 76 of the communication oil passage 72b efficiently flows into the MG1 cooling pipe 86. As indicated by arrows, the oil inflowing from the oil flow inlet 87 of the MG1 cooling pipe 86 is discharged from oil discharge holes 88 formed in the MG1 cooling pipe 86 and is supplied to coil ends 90 etc., of the first electric motor MG1. Since the oil flowing into the MG1 cooling pipe 86 is also the cooled oil supplied from the oil supply port 52, the first electric motor MG1 is effectively cooled. The MG1 cooling pipe 86 corresponds to a second pipe of the present invention, and a lubrication device of the hybrid vehicle power transmission device 10 of the present invention includes the MG1 cooling pipe, the MG2 cooling pipe 72, the first catch tank 60, the second catch tank 64, etc., described above.

Figure 6:
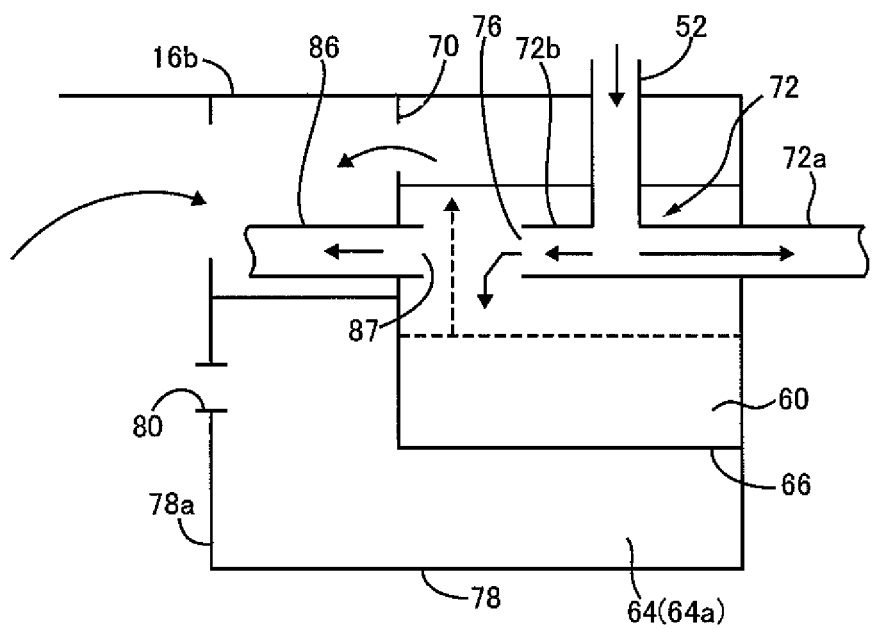
FIG. 6 is a simplified oil passage configuration diagram of the structure of the lubrication device included in the power transmission device of FIG. 1.

The operation of the lubrication device of the power transmission device 10 configured in this way will be described in more detail. FIG. 6 is a simplified oil passage configuration diagram of the structure of the lubrication device described above. In FIG. 6, oil flowing into the oil supply port 52 is supplied to the electric motor cooling oil passage 72a and the communication oil passage 72b making up the MG2 cooling pipe 72. The oil flowing through the electric motor cooling oil passage 72a is supplied to the second electric motor MG2 and the oil flowing through the communication oil passage 72b is supplied to the first catch tank 60. When the height of the oil surface (oil level) of the first catch tank 60 becomes higher than the height of the MG1 cooling pipe 86, the oil flows from the oil flow inlet 87 into the MG1 cooling pipe 86 and is supplied to the first electric motor MG1. When the oil level of the first catch tank 60 exceeds the height of the lower end of the oil flow outlet 70, the oil flows out from the oil flow outlet 70 and flows down (drops down) to the oil accumulating portion 64a of the second catch tank 64. The second catch tank 64 accumulates the oil outflowing from the first catch tank 60 and the oil scraped up by the second driven gear 50 etc. When the oil level of the second catch tank exceeds the height of the upper end portion of the dividing wall 78a, oil flows into the space 64b and the oil is supplied to the lubrication oil supply hole 80. In other words, when an amount of oil accumulated in the oil accumulating portion 64a of the second catch tank 64 exceeds a preset amount, the oil is supplied to the space 64b. The capacity of the oil accumulating portion 64a is adjustable with the height of the dividing wall 78b etc. The oil supplied to the lubrication oil supply hole 80 is supplied to gears that are lubrication-requiring portions including the deceleration planetary gear device 24. As can be seen from FIG. 6, the oil flow outlet 70 disposed in the first catch tank 60 is located above the MG1 cooling pipe 86.

For example, a lower vehicle speed decreases a supply amount of the oil supplied from the oil pump 30. Therefore, although the second electric motor MG2 is directly supplied with the oil from the oil supply port 52 through the electric motor cooling oil passage 72a, the height of the oil surface (oil level) of the first catch tank 60 needs to exceed the height of the MG1 cooling pipe 86 for cooling the first electric motor MG1. In this regard, since the first catch tank 60 of this example accumulates oil earlier than the second catch tank 64 and has the capacity thereof smaller than that of the second catch tank 64, even if the supply amount of oil to the first catch tank 60 is reduced, the oil level of the first catch tank 60 quickly rises. Therefore, since the oil is quickly accumulated in the first catch tank 60, the oil cooled through the MG1 cooling pipe 86 is also quickly supplied to the first electric motor MG1.

A higher vehicle speed increases an amount of oil supplied to the oil supply port 52 by the oil pump 30 and an amount of oil scraped up by the second driven gear 50 etc. In this case, the amount of oil accumulated in the first catch tank 60 is maximized and excess oil flows out from the oil flow outlet 70 to the oil accumulating portion 64a of the second catch tank 64. The oil scraped up by the second driven gear 50 etc., also flows into the second catch tank 64. Since the second catch tank 64 of this example is disposed such that a larger volume of oil can be accumulated as compared to the first catch tank 60, a large amount of oil is accumulated in the oil accumulating portion 64a of the second catch tank 64. When a large amount of oil is accumulated in the second catch tank 64 in this way, an amount of oil supplied to the lubrication oil supply hole 80 is reduced even at a higher vehicle speed. The excessive oil supply to gears such as the deceleration planetary gear device 24 increases agitation resistance due to oil viscosity. In this regard, since a large amount of oil is accumulated in the second catch tank 64 in this example, the excessive oil supply to the gear member is suppressed and the agitation resistance is reduced.

The oil supplied from the lubrication oil supply hole 80 to the gear member is desirably relatively high-temperature oil with low oil viscosity. In this regard, the oil supplied to the lubrication oil supply hole 80 is supplied from the oil outflowing from the oil accumulating portion 64a of the second catch tank 64 and the high-temperature oil scraped up by the second driven gear 50 etc. The oil accumulated in the oil accumulating portion 64a of the second catch tank 64 is a mixture of the oil outflowing from the first catch tank 60 and the high-temperature oil scraped up by the second driven gear 50 and therefore has an oil temperature higher than the oil in the first catch tank 60. Therefore, the lubrication oil supply hole 80 is supplied with oil having a high oil temperature, which prevents the direct supply of the low-temperature oil in the first catch tank 60. This reduces an increase in the agitation resistance of the gears due to the supply of low-temperature oil with high viscosity.

As described above, according to this example, oil forcibly transferred from the oil pump 30 is preferentially supplied through the MG2 cooling pipe 72 to the second electric motor MG2. On the other hand, the first electric motor MG1 is supplied with oil accumulated in the first catch tank 60 through the MG1 cooling pipe 86. Since oil is accumulated in the first catch tank 60 earlier than the second catch tank 64, the accumulated oil is quickly supplied to the MG1 cooling pipe 86. Therefore, even while a smaller amount of oil is supplied from the oil pump 30 and due to the scraping-up by the second driven gear 50 etc., for example, even during a low vehicle speed, the oil supplied to the first electric motor MG1 can quickly be ensured. Although a higher vehicle speed increases amounts of oil forcibly transferred from the oil pump 30 and oil scraped up by the second driven gear 50 etc., since the oil flows down from the first catch tank 60 and is accumulated in the second catch tank 64, the excessive oil supply to the deceleration planetary gear device 24 etc., is reduced and the agitation resistance of the gears due to oil viscosity is reduced. As described above, oil can be supplied to the first electric motor MG1, the second electric motor MG2, and the gear members in appropriate distribution. Since low-temperature oil forcibly transferred by the oil pump 30 is supplied to the first electric motor MG1 and the second electric motor MG2, high-temperature oil is prevented from being supplied to the first electric motor MG1 and the second electric motor MG2.

According to this example, the space 64b of the second catch tank 64 is disposed with the lubrication oil supply hole 80 for supplying oil to the gear members such as the deceleration planetary gear device 24, and the lubrication oil supply hole 80 is disposed at a position supplied with oil when an accumulation amount of oil in the second catch tank 64 exceeds a preset amount. As a result, since the preset amount of oil is accumulated in the second catch tank 64, excessive oil supply to the gears such as the deceleration planetary gear device 24 is prevented even during high speed running and an appropriate amount of oil can be supplied to the gear members.

According to this example, the second catch tank 64 has the dividing wall 78a formed for dividing into the oil accumulating portion 64a accumulating oil and the space 64b disposed with the lubrication oil supply hole 80 and, when the height of the oil surface of the oil accumulating portion 64a exceeds the upper end portion of the dividing wall 78a, the oil is supplied to the lubrication oil supply hole 80. As a result, the configuration of supplying an appropriate amount of oil to the gear members is easily provided by adjusting the position of the upper end portion of the dividing wall 78a.

According to this example, the MG2 cooling pipe 72 is extended to a position vertically above the second electric motor MG2 and the MG1 cooling pipe 86 is extended to a position vertically above the first electric motor MG1. As a result, oil can efficiently be supplied to the first electric motor MG1 and the second electric motor MG2.

According to this example, the communication oil passage 72b is disposed in the vicinity of the oil flow inlet 87 of the MG1 cooling pipe 86 in series and the restrictor 76 is formed at the leading end of the communication oil passage 72b. As a result, the oil outflowing from the restrictor 76 of the communication oil passage 72b efficiently flows into the oil flow inlet 87 of the MG1 cooling pipe 86.

According to this example, the oil forcibly transferred from the oil pump 30 is supplied through the external pipes 54 disposed outside the transaxle case 16 to the MG2 cooling pipe 72. As a result, the oil is cooled when passing through the external pipes 54 and the cooled oil can be supplied to the MG2 cooling pipe 72.

According to this example, the cooler 55 is inserted between the external pipes 54. As a result, the oil passing through the external pipes 54 is further cooled and the cooled oil can be supplied to the MG2 cooling pipe 72.

Although the example of the present invention has been descried in detail with reference to the drawings, the present invention is applied in other forms.

For example, although the cooler 55 is disposed in the example, the cooler 55 is not necessarily needed and may be omitted. This is because the external pipes passing through the outside of the transaxle case 18 are in contact with the outside air, causing the oil to be cooled when passing through the external pipes.

Although the oil pump 30 is integrally disposed with the cover 16c in the example, the oil pump 30 may separately be disposed, rather than integrally.

The above description is merely an embodiment and the present invention may be implemented in variously modified and improved forms based on the knowledge of those skilled in the art.

NOMENCLATURE OF ELEMENTS

10: hybrid vehicle power transmission device 16: transaxle case 22: power distribution planetary gear device (gear member) 24: deceleration planetary gear device (gear member) 30: oil pump 54: external pipes (third pipe) 55: cooler 60: first catch tank (first catch tank) 64: second catch tank (second catch tank) 70: oil flow outlet 72: MG2 cooling pipe (first pipe) 72b: communication oil passage (oil passage) 76: restrictor 78a: dividing wall 80: lubrication oil supply hole 86: MG1 cooling pipe (second pipe) MG1: first electric motor MG2: second electric motor

The invention claimed is:

1. A lubrication device for a hybrid vehicle power transmission device including a gear member, a first electric motor, and a second electric motor within a transaxle case, the lubrication device comprising:
   a first pipe supplying oil forcibly transferred from an oil pump to the second electric motor;
   an oil passage branched from the first pipe;
   a first catch tank supplied with oil from the oil passage;
   a second pipe connected to the first catch tank to supply oil accumulated in the first catch tank to the first electric motor;
   an oil flow outlet disposed in the first catch tank and located above the second pipe; and
   a second catch tank disposed vertically beneath the first catch tank to receive oil outflowing from the oil flow outlet.

2. The lubrication device for a hybrid vehicle power transmission device of claim 1, wherein
   the second catch tank is disposed with a lubrication oil supply hole for supplying oil to the gear member, and wherein
   the lubrication oil supply hole is disposed at a position supplied with oil when an accumulation amount of oil in the second catch tank exceeds a preset amount.

3. The lubrication device for a hybrid vehicle power transmission device of claim 2, wherein
the second catch tank has a dividing wall formed for dividing into an oil accumulating portion accumulating oil and a space disposed with the lubrication oil supply hole, and wherein when a height of an oil surface of the oil accumulating portion exceeds an upper end portion of the dividing wall, oil is supplied to the lubrication oil supply hole.

4. The lubrication device for a hybrid vehicle power transmission device of claim 1, wherein
the first pipe is extended to a position vertically above the second electric motor, and wherein
the second pipe is extended to a position vertically above the first electric motor.

5. The lubrication device for a hybrid vehicle power transmission device of claim 1, wherein
the oil passage is disposed in the vicinity of an oil flow inlet of the second pipe in series, and wherein
a restrictor is formed in the oil passage.

6. The lubrication device for a hybrid vehicle power transmission device of claim 1, wherein
the oil forcibly transmitted from the oil pump is supplied through a third pipe disposed outside the transaxle case to the first pipe.

7. The lubrication device for a hybrid vehicle power transmission device of claim 6, wherein
a cooler is interposed in the third pipe.

\* \* \* \* \*